(12) United States Patent
Sivertsen

(10) Patent No.: US 8,248,538 B2
(45) Date of Patent: *Aug. 21, 2012

(54) SYSTEM AND APPARATUS FOR SELECTIVELY TERMINATING A VIDEO SIGNAL BASED ON THE PRESENCE OR ABSENCE OF A TERMINATING DEVICE

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/008,690

(22) Filed: Jan. 18, 2011

(65) Prior Publication Data

US 2011/0109806 A1 May 12, 2011

Related U.S. Application Data

(63) Continuation of application No. 12/625,107, filed on Nov. 24, 2009, now Pat. No. 7,898,601, which is a continuation of application No. 11/215,629, filed on Aug. 30, 2005, now Pat. No. 7,633,560.

(51) Int. Cl.
*H04N 17/00* (2006.01)
*H04N 17/02* (2006.01)
*H04N 5/268* (2006.01)

(52) U.S. Cl. ........................................ 348/705; 348/180

(58) Field of Classification Search .......................... None
See application file for complete search history.

(56) References Cited

U.S. PATENT DOCUMENTS

| | | | |
|---|---|---|---|
| 5,465,105 | A | 11/1995 | Shatas et al. |
| 5,799,204 | A | 8/1998 | Pesto, Jr. |
| 5,812,785 | A | 9/1998 | Lappen et al. |
| 5,825,321 | A | 10/1998 | Park |
| 5,857,861 | A | 1/1999 | Silliman |
| 5,909,063 | A | 6/1999 | Silliman et al. |
| 5,953,057 | A | 9/1999 | Thompson et al. |
| 6,150,997 | A | 11/2000 | Asprey |
| 6,154,067 | A | 11/2000 | Cheung |
| 6,181,118 | B1 | 1/2001 | Meehan et al. |
| 6,184,919 | B1 | 2/2001 | Asprey et al. |
| 6,231,379 | B1 | 5/2001 | Shen |

(Continued)

OTHER PUBLICATIONS

U.S. Notice of Allowance/Allowability dated Aug. 6, 2009 in U.S. Appl. No. 11/215,629.

(Continued)

*Primary Examiner* — Brian Yenke
(74) *Attorney, Agent, or Firm* — Morris Manning & Martin, LLP; Tim Tingkang Xia, Esq.

(57) ABSTRACT

A system and apparatus are provided for selectively terminating an analog video signal depending on whether or not a terminating device is present. A conditional terminator receives an analog video signal from a video input and terminates the video signal in the absence of a terminating device and does not terminate the video signal when a terminating device is connected to the analog video signal. A conditional terminator may comprise a resistor and transistor connecting the video signal to ground when a ground signal from a terminating device is not present and disconnecting the signal from ground as a result of the presence of a ground signal from a connected terminating device. The conditional termination may occur in a video input device or alternatively in a video cable connector.

6 Claims, 5 Drawing Sheets

U.S. PATENT DOCUMENTS

| | | |
|---|---|---|
| 6,246,432 B1 | 6/2001 | Takami et al. |
| 6,396,611 B1 | 5/2002 | Distefano et al. |
| 6,411,330 B1 | 6/2002 | Purcell et al. |
| 6,530,085 B1 | 3/2003 | Perlman |
| 6,545,707 B1 | 4/2003 | Newcomb et al. |
| 6,687,907 B1 | 2/2004 | Bortolini |
| 6,711,639 B1 | 3/2004 | Singer et al. |
| 6,786,764 B2 | 9/2004 | Sivertsen |
| 6,907,615 B1 | 6/2005 | Alexander et al. |
| 6,940,440 B1 | 9/2005 | Iacob |
| 7,200,856 B2 | 4/2007 | Perlman |
| 7,324,167 B2 | 1/2008 | Miller |
| 2002/0065970 A1* | 5/2002 | Tanaka et al. ............... 710/301 |
| 2003/0184680 A1 | 10/2003 | Takahashi |
| 2005/0086552 A1 | 4/2005 | Matsubara |
| 2005/0117059 A1 | 6/2005 | Smits et al. |
| 2005/0138245 A1 | 6/2005 | Chen |

OTHER PUBLICATIONS

U.S. Official Action dated Mar. 27, 2009 in U.S. Appl. No. 11/215,629.

* cited by examiner

SYSTEM AND APPARATUS FOR SELECTIVELY TERMINATING A VIDEO SIGNAL BASED ON THE PRESENCE OR ABSENCE OF A TERMINATING DEVICE

CROSS-REFERENCE TO RELATED APPLICATIONS

This application is a continuation of U.S. patent application Ser. No. 12/625,107, now issued U.S. Pat. No. 7,898,601, entitled "System and Apparatus for Selectively Terminating a Video Signal Based on the Presence or Absence of a Terminating Device", which itself is a continuation of U.S. patent application Ser. No. 11/215,629, now U.S. Pat. No. 7,633,560, entitled "System and Apparatus for Selectively Terminating a Video Signal Based on the Presence or Absence of a Terminating Device," filed Aug. 30, 2005, both of which are expressly incorporated herein by reference in their entireties.

FIELD OF THE INVENTION

Embodiments of the invention relate generally to the field of analog video signals. More particularly, embodiments of the invention relate to a system and apparatus for selectively terminating an analog video signal depending on whether or not a terminating device is connected to the signal.

BACKGROUND OF THE INVENTION

It is often desirable to provide an analog video signal to multiple devices from a single video source. For example, multiple external monitors may be connected to a video source. Additionally, video signals are sometimes provided from a video source to a video capture device (VCD) that captures the video signal and transmits the signal to a remote monitoring site while simultaneously being provided to a local monitor. There are methods of providing a single video signal to multiple devices while minimizing signal degradation. One such method is to use an active video splitter. A video splitter splits a single video signal input into multiple output signals. The video input is terminated, then each output signal has a buffer to drive the signal into each load.

According to standards set forth by the Video Electronics Standards Association (VESA), a typical Video Graphics Array (VGA) video source has for each of a red, blue, and green signal, a 2X buffer followed by 75-Ohm resistor connected in series. Because the bandwidth of VGA is very high, the video signal must be terminated correctly in order to maintain a clean signal. Therefore, within a video receiving device such as a monitor, each signal must have a 75-Ohm parallel termination resistor followed by a receiving buffer. Using the video splitter described above, each video signal created by a split is driven using the required buffer and resistor. Each signal is properly terminated at the destination device according to VGA standards. If a device is disconnected from one of the split signals, the other signals will not be affected since each signal is independently amplified and terminated. However, there are several disadvantages to this method of splitting a video signal.

First, each output signal requires a VGA connector. For example, if a splitter splits a single video signal into three output video signals, three VGA connectors are required on the output side of the splitter, one for each cable connecting the signal to a corresponding video device. This requires the splitter to be at least as big as the corresponding VGA connectors. These splitters are often external boxes that increase the external space requirements. Additionally, multiple cables are also required, creating a need for additional space as well as adding to the visually unappealing bundle of cables behind a computer. Finally, because splitters compensate for signal loss using buffers, the buffers also amplify the noise in a signal, creating a certain amount of signal degradation.

Another method of providing a video signal to multiple devices may be illustrated using an example environment comprising a single video source, a video capture device, and a local monitor. Because the video source and monitor contain the necessary electrical components to properly terminate the video signal, the video signal within the cable may be additionally routed to the video capture device as long as the VCD does not terminate the video signal. If the VCD were to terminate the signal, then the voltage at the monitor would be reduced, causing the display quality to be significantly reduced. Therefore, as long as the monitor receives the video signal and as long as the VCD does not terminate the signal, the video signal quality remains intact. A problem arises, however, when the local monitor is disconnected from this system since the video signal would no longer be properly terminated. Existing VCDs, monitors, and video cables do not provide the flexibility of being able to be used in a system that includes a local monitor, a system that does not include a local monitor, and a system to which a local monitor is periodically attached without modification.

It is with respect to these and other considerations that the various embodiments of the present invention have been made.

SUMMARY OF THE INVENTION

Aspects of the present invention address these problems and others by providing a system and apparatus for selectively terminating a split analog video signal depending on whether or not a terminating device is present. According to one aspect of the present invention, a video input receives an analog video signal. A conditional terminator terminates the analog video signal in the absence of a terminating device and does not terminate the video signal when a terminating device is connected to the analog video signal. A conditional terminator may comprise a resistor and transistor combination that connects the analog video signal to ground when a ground signal from a terminating device is not present and disconnects the analog video signal from ground as a result of the presence of a ground signal from a connected terminating device.

According to another aspect of the present invention, a cable is provided for conditionally terminating an analog video signal. The cable includes a first connector operative to receive an analog video signal from a video source. A second connector is operative to provide the analog video signal to a terminating device. A third connector is operative to provide the analog video signal to a local video input device and to the second connector. The cable also includes a conditional terminator that terminates the video signal when a terminating device is not connected to the second connector and does not terminate the video signal when a terminating device is connected to the second connector. The conditional terminator may comprise a resistor and transistor combination connecting the video signal to ground when a ground signal from a terminating device is not present from the second connector and disconnecting the signal from ground as a result of the presence of a ground signal from a connected terminating device through the second connector.

According to yet another aspect of the present invention, a video capture device selectively terminates an analog video signal depending on whether a terminating device is connected to the analog video signal. The video capture device includes a single VGA connector operative to receive the analog video signal, a conditional terminator electrically connected to the VGA connector for selectively terminating the analog video signal based upon the presence or absence of a terminating device, and video capture circuitry electrically connected to the conditional terminator.

These and various other features as well as advantages, which characterize the present invention, will be apparent from a reading of the following detailed description and a review of the associated drawings.

DETAILED DESCRIPTION OF THE INVENTION

As described briefly above, embodiments of the present invention provide a method and apparatus for splitting and selectively terminating an analog video signal depending upon whether or not a terminating device is present. Referring now to the figures, in which like numerals represent like elements, several illustrative embodiments of the present invention will be described. It should be appreciated that the embodiments described herein are merely illustrative and that the various embodiments may be combined, other embodiments may be utilized, and structural, logical, and electrical changes may be made without departing from the spirit and scope of the present invention. The following detailed description is, therefore, not to be taken in a limiting sense, and the scope of the present invention is defined by the pending claims and their equivalents.

Figures 1, 1A:
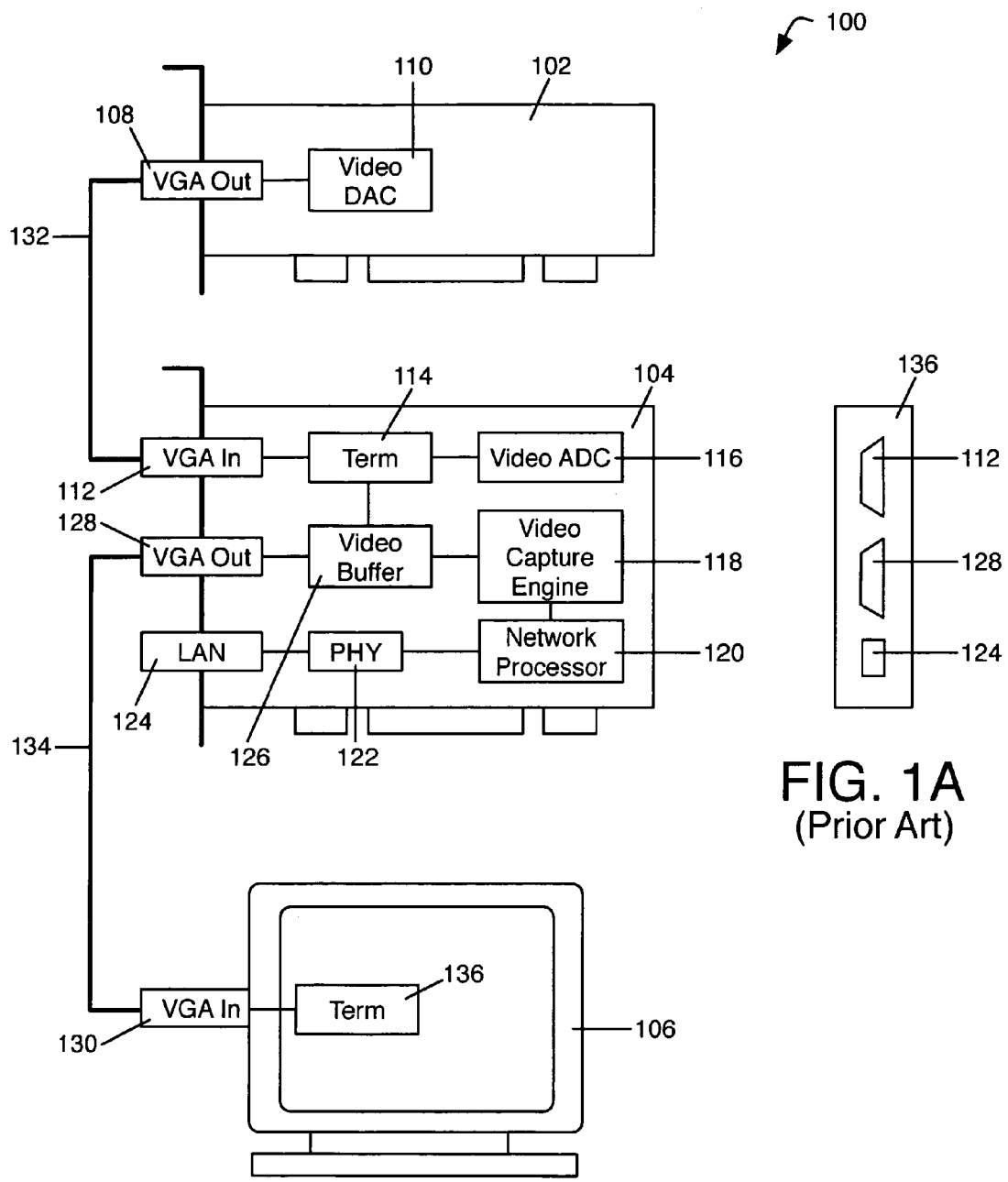
FIG. 1 is functional block diagram illustrating the path of an analog video signal transmitted from a video source through a video input device to a terminating device and the corresponding electronic components.
FIG. 1A is a front view of a video capture device card faceplate illustrating connectors for receiving and transmitting video signals.

Turning now to FIG. 1, a typical remote computer management (RCM) system 100 that utilizes an analog video signal transmitted to two different video input devices will be described. RCM system 100 illustrates a system in which an analog video signal is transmitted to two different video input devices from a single video source, video card 102. The first video input device is RCM card 104. RCM card 104 is used for capturing video signals and transmitting them to a remote location for monitoring. While RCM card 104 is used for illustration purposes, it should be understood that RCM card 104 may be any device, external to a computer or internal, that receives an analog video signal, including a monitor. The second video input device is local monitor 106. A monitor is a terminating device that terminates an analog video signal in a manner described below with respect to FIGS. 4 and 5A. It should be understood that while local monitor 106 is used as an example, any device that properly terminates an analog video signal is a terminating device that may be used in place of local monitor 106. Other examples include any other display device as well as video capture devices.

Video card 102 is any standard video card used with a personal computer (PC). It could be a video chip located on a motherboard, the motherboard having a VGA connector 108. Video card 102 comprises video digital-to-analog converter 110, which sends an analog video signal out VGA connector 108, through cable 132, to VGA connector 112 located on an RCM card 104. Card 102 contains other electrical components, however, only select video components are shown for clarity. VGA connectors 108, 112, 128, and 130 may be standard male or female 15-pin VGA connectors or any other connectors for transmitting and receiving analog video signals.

RCM card 104 includes VGA connector 112, terminator 114, analog-to-digital converter (ADC) 116, video buffer 126, video capture engine 118, network processor 120, physical layer 122, and local area network (LAN) connector 124. The analog video signal from video source 102 is transmitted through cable 132 to VGA connector 112. The video signal is terminated at terminator 114 to ensure that a clean video signal is captured with minimal signal degradation. Terminator 114 and analog video signal termination in general is discussed in greater detail below with respect to FIGS. 4 and 5. Components 116, 118, 120, 122, and 124 operate to capture the video signal and transmit the signal via a LAN to a remote computer. The video buffer 126 amplifies the signal for transmittal to local display device 106 through cable 134. The video signal is received through VGA connector 130 and properly terminated by terminator 136 within the local display device 106. As stated above, it is to be understood that RCM card is used for illustrative purposes and that any video input device that receives video signals may be used.

FIG. 1A shows the faceplate of RCM card 104. VGA connectors 112 and 128 can be seen as well as LAN connector 124. RCM card 104 is an add-in card that is installed within a computer, such as a PCI card. Because VGA connectors 112 and 128 are both necessary using the above described configuration, faceplate 136 must occupy a standard height PCI card slot in a computer and will not fit into a low profile card slot utilized by smaller cards that do not require the amount of space used by a standard PCI card slot. A low profile card slot accepts cards with a maximum height of 2.536 inches.

Figures 2, 2A:
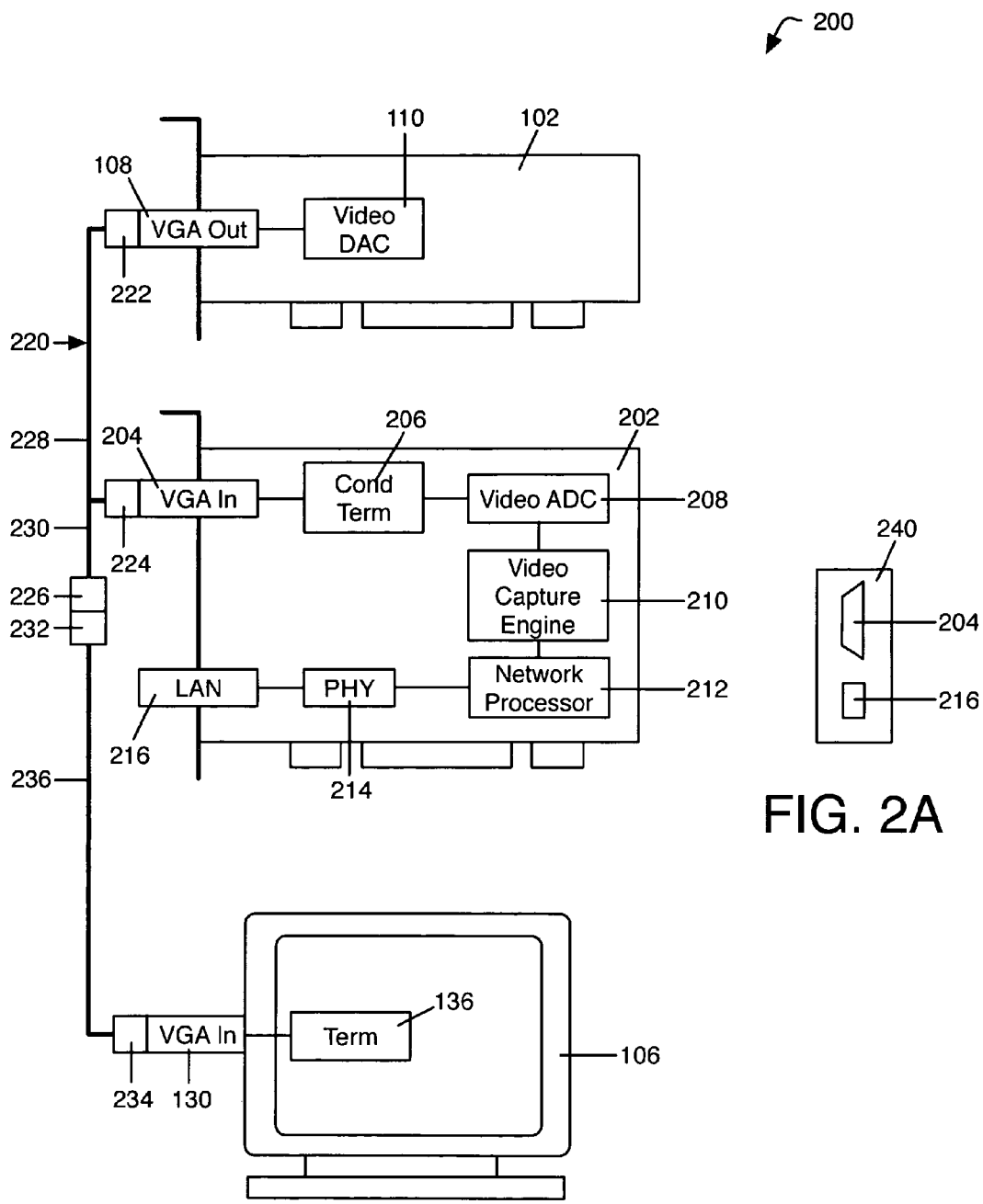
FIG. 2 is a functional block diagram illustrating the path of an analog video signal transmitted from a video source to a video input device and to a terminating device and the corresponding electronic components according to one embodiment of the present invention.
FIG. 2A is a front view of a video capture device card faceplate illustrating connectors for receiving and transmitting video signals according to one embodiment of the present invention.
Figure 3:
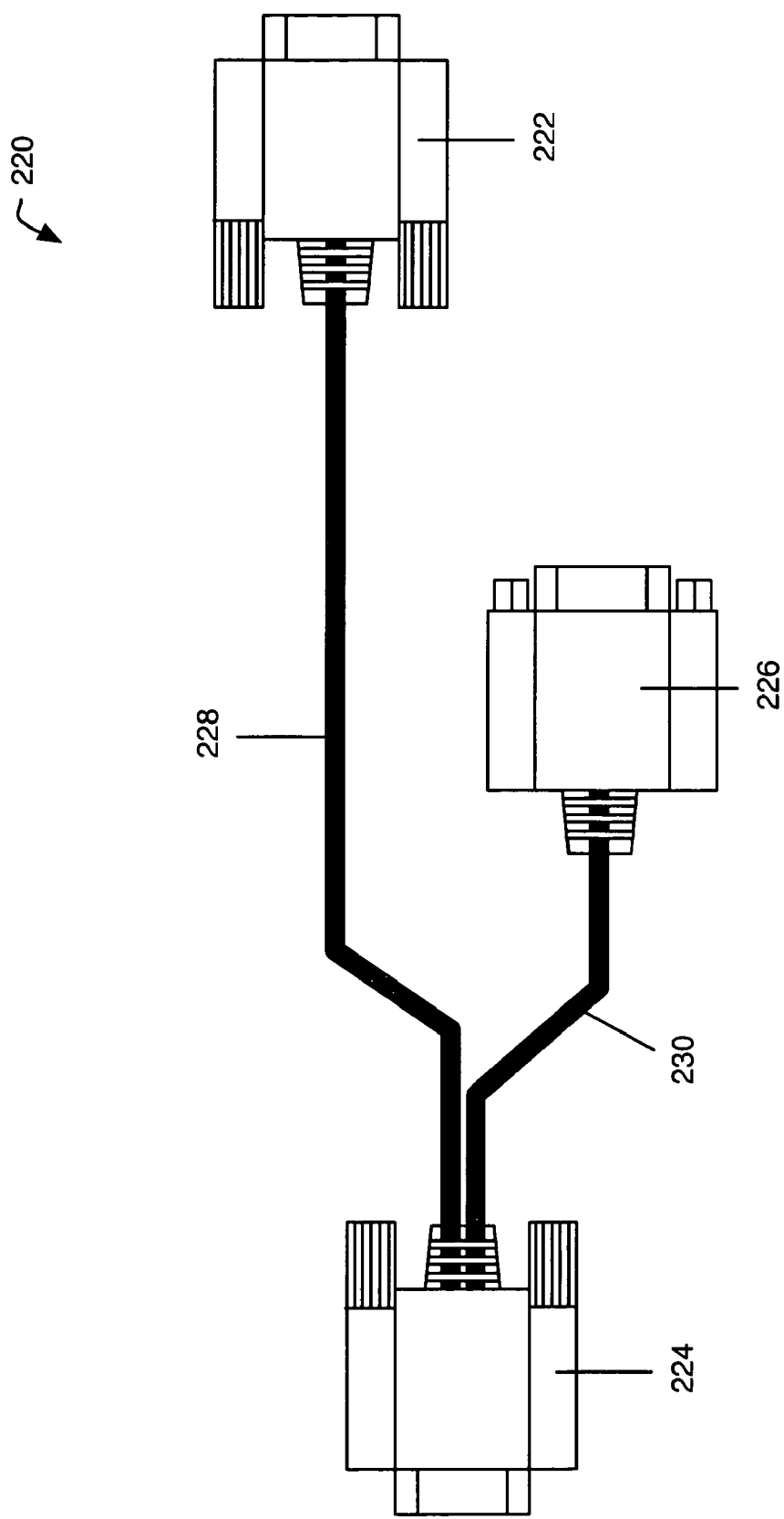
FIG. 3 is a top view of a video cable illustrating a cable configuration comprising three connectors according to embodiments of the present invention.

Referring now to FIG. 2, a RCM system 200 utilizing one embodiment of the present invention is shown. System 200 comprises video source 102. As described in reference to FIG. 1, video source 102 may be a standard video card or motherboard with video chip. Video source 102 comprises digital-to-analog converter 110 and VGA connector 108. Video cable 220 is attached to VGA connector 108. As seen in FIG. 3, cable 220 includes cables 230 and 228, as well as VGA connectors 222, 224, and 226. Connectors 222, 224, and 226 may be male or female connectors depending on corresponding connectors 108, 204, and 130 shown in FIG. 2. Cables 228 and 230 are spliced together inside of connector 224 such that a video signal transmitted from connector 222 travels to two different video input devices attached to connectors 224 and 226. As seen in the example system 200 depicted in FIG. 2, connector 222 is connected to a corresponding VGA connector 108 on video source 102. The video signal travels to RCM card 202 through VGA cable connector 224 and corresponding VGA connector 204 on the RCM card.

The video signal is also transmitted from video source 102 to local monitor 106. The signal travels through cable 228 to cable 230 via VGA connector 224. The signal travels from cable 230 to standard monitor cable 236 via mated VGA connectors 226 and 232. The signal travels from cable 236 to monitor 106 via mated VGA connectors 234 and 130 and is terminated at terminator 136. Preferably, cable 230 is short with respect to cable 228 in order to minimize signal reflections created by an impedance mismatch when monitor 106 is not connected to connector 226. Because most monitors are sold with a VGA cable, it is possible for cable 230 to be short to minimize reflections and still be able to have a lengthy cable run to monitor 106 using a standard cable 236 supplied with the monitor. Alternatively, cable 230 and connector 226 may be configured to connect directly to VGA connector 130 on monitor 106. FIG. 2A shows the faceplate 240 of RCM card 202. VGA connector 204 can be seen as well as LAN connector 216. RCM card 202 is able to fit into a low profile PCI card slot in a computer since only a single VGA connector is required.

The RCM card 202 contains electronic components 208, 210, 212, 214, and 216 that perform the same function as components 116, 118, 120, 122, and 124 shown in FIG. 1. As discussed above, however, the RCM card 202 is designed to fit within a low profile PCI card slot since it requires only a single VGA connector 204 in conjunction with cable 220 in order to share the video signal transmitted from video source 102 with local monitor 106. The component that allows for a single VGA connector 204 to be used in conjunction with a single video cable 220 with three connectors is conditional terminator 206. Conditional terminator 206 effectively terminates the video signal when monitor 106 is not connected to VGA connector 226 and does not terminate the video signal when a local monitor is connected to VGA connector 226. When local monitor 106 is connected to VGA connector 226, the analog video signal is terminated at terminator 136 rather than at conditional terminator 206. A discussion regarding video signal termination is appropriate at this point to best understand the operation of conditional terminator 206.

Figure 4:
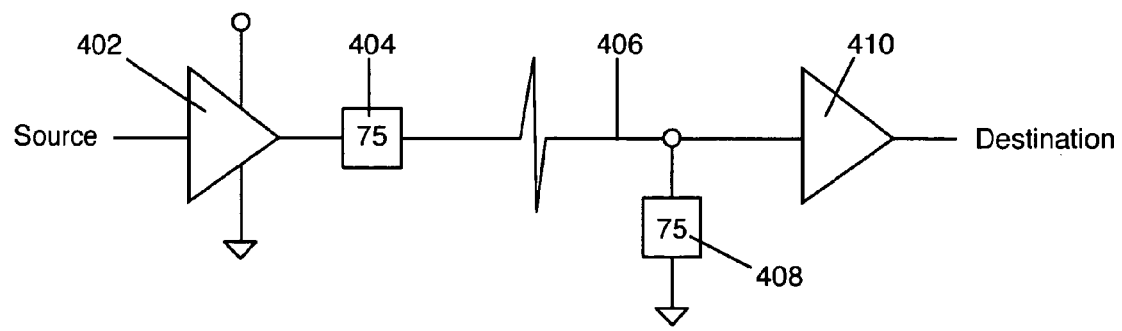
FIG. 4 is a schematic diagram illustrating video signal termination according to VGA standards.
Figure 5A:
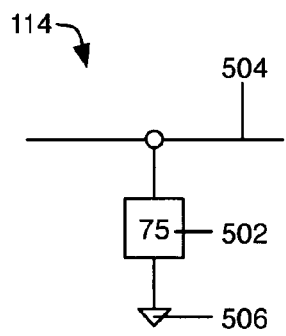
FIG. 5A is a schematic diagram illustrating a typical parallel terminating resistor.

Looking at FIG. 4, a simplified schematic is shown that depicts the electrical components necessary to transmit an analog video signal from a video source to a monitor or other destination according to VGA standards. As explained above, an analog video signal must be properly terminated due to the high bandwidth involved with VGA. FIG. 4 illustrates a properly terminated video signal. At the video source, a buffer 402 amplifies the signal voltage by a factor of two. A 75-Ohm resister 404 in series with the buffer 402 has a resistance equivalent to the impedance of the cable 406, 75 Ohms in this example. At the destination, the video signal is terminated using a parallel 75-Ohm resister 408 that connects the video signal to ground. Buffer 410 amplifies the signal for use at the destination. FIG. 5A shows terminator 114 comprising a 75-Ohm parallel resistor connecting red, green, blue (RGB) signals 504 to ground 506. In FIGS. 5A-7, the video signal is shown as a single RGB signal for clarity purposes; however, it is to be understood that each of the red, green, and blue signals is terminated in the same manner.

Returning to FIG. 4, if cable 406 provides a second device with the video signal in addition to the destination device, the signal would not need to be terminated again at the second device because it is already terminated at the destination. A problem arises, however, if the original destination device is removed, taking parallel terminating resistor 408 from the circuit. Likewise, if cable 406 provides the analog video signal to a second device that includes a signal termination and a monitor with a signal terminator already exists in the circuit, then the signal will be terminated twice and the display device will likely darken.

Figure 5B:
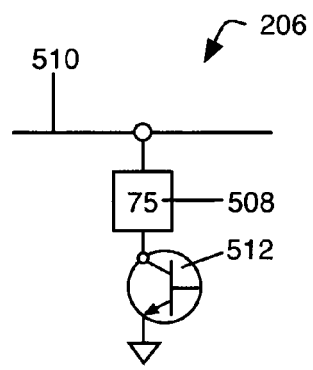
FIG. 5B is a schematic diagram illustrating a conditional terminator according to one embodiment of the present invention.

These problems are remedied using a conditional terminator 206 shown in FIGS. 2 and 5B. Conditional terminator 206 comprises a 75-Ohm parallel resistor 508 connecting a RGB signal 510 to ground. However, instead of connecting the signal 510 directly to ground, conditional terminator 206 utilizes transistor 512 to selectively connect signal 510 to ground. It is to be understood that while a transistor is shown in FIGS. 5B-7, any other switch device operable to selectively connect signal 510 to ground may be used, such as an electromechanical relay, analog switch, mechanical switch, or any other electronics device that can controllably switch a signal to ground. When transistor 512 is activated, the transistor connects the video signal to ground through resistor 508. When transistor 512 is deactivated, the transistor does not connect the video signal to ground, effectively removing resistor 508 from the circuit. Using a conditional terminator as shown in FIGS. 2 and 5B, a video input device such as the RCM card shown in FIG. 2 may be used in a computer system with or without a local monitor and will maintain signal integrity when a local monitor is added or removed from the system during operation of the RCM card.

Figure 6:
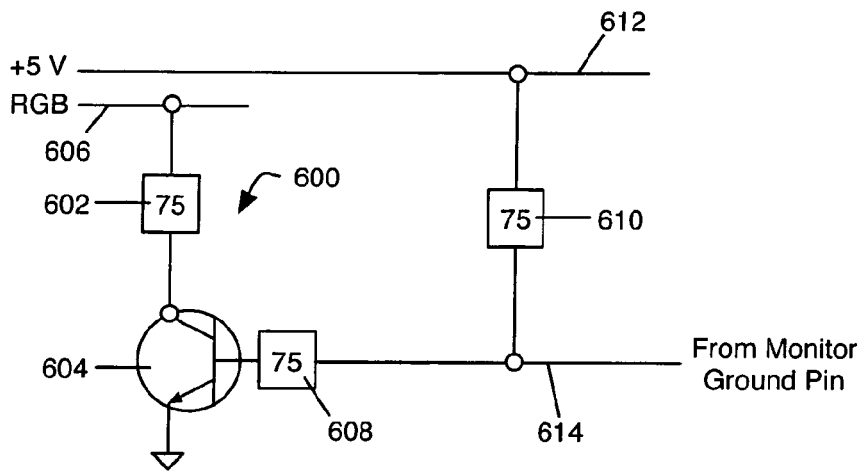
FIG. 6 is a schematic diagram illustrating conditional termination components according to one embodiment of the present invention.

As mentioned above, a conditional terminator is activated and deactivated based upon the presence or absence of a local monitor. While a local display device or monitor is described here and shown in the drawings, it is to be understood that any video input device that includes a parallel terminator to properly terminate an analog video signal is equally applicable to the embodiments of the present invention described herein. The presence or absence of a monitor is determined from the presence or absence of a ground signal from a monitor. FIG. 6 illustrates the conditional termination components and the corresponding power, video, and ground signals with which the components interact. An RGB signal 606 and +5 volt power supply 612 are provided by a video source. A conditional terminator 600 connects RGB signal 606 to ground. The conditional terminator 600 includes 75-Ohm resistor 602 and transistor 604.

Transistor 604 requires a base current to activate and connect the video signal to ground. 75-Ohm resistor 610 is added in parallel, connecting the +5 volt power supply to the transistor base, through 75-Ohm resistor 608. This connection activates transistor 604, terminating the video signal. This occurs when no local monitor is present. When a local monitor is introduced, the monitor supplies a ground signal 614 to the transistor 604 via a dedicated ground pin in the connector connecting the video cable to the local monitor. This ground signal 614 pulls the power supply to ground and deactivates the transistor 604. Once deactivated, the 75-Ohm resistor 602 is effectively removed from the circuit and the video signal is no longer terminated at this location. However, because the monitor terminates the signal utilizing a parallel terminator as described above, overall signal integrity is substantially maintained.

Figure 7:
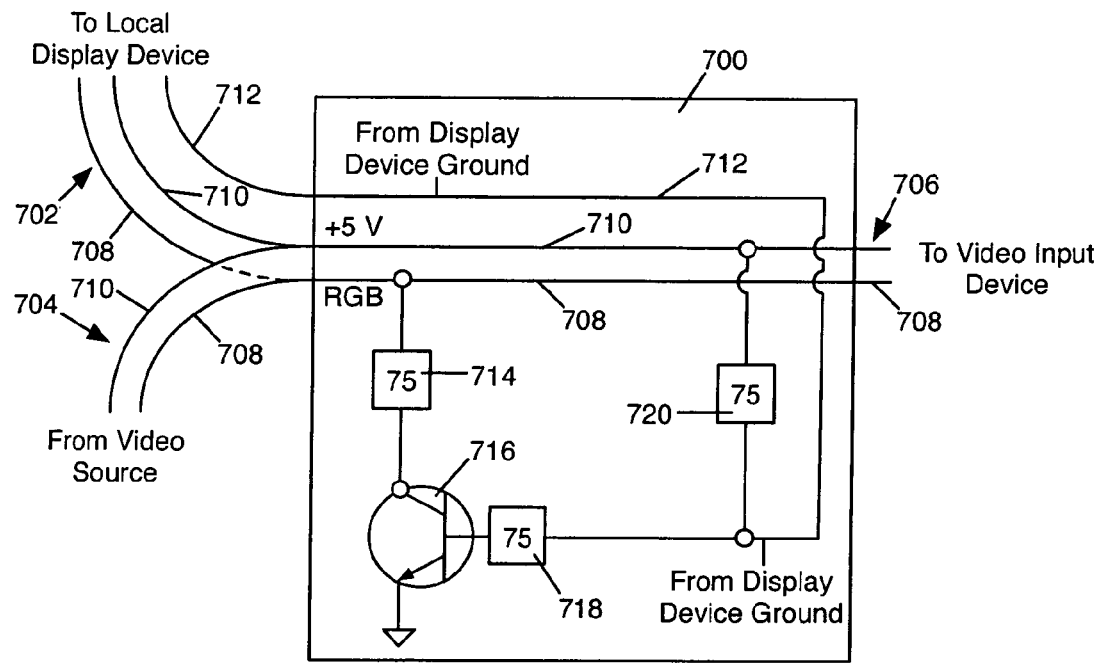
FIG. 7 is a schematic diagram illustrating cable components according to one embodiment of the present invention.

In an alternate embodiment shown in FIG. 7, the conditional terminator and corresponding components for selectively terminating a video signal are located within a video cable connector rather than in a video input device such as the RCM card 202 described with respect to FIG. 2. The resulting smart cable may be used with a video input device that does not have any means for terminating a video signal. FIG. 7 is drawn out of scale to clearly show the conditional terminator components located within a VGA connector on a video cable. For clarity, FIG. 7 may be compared to the cable shown in FIG. 3. If the cable shown in FIG. 3 were a smart cable such as the one depicted in FIG. 7, then VGA connector 224 would be equivalent to VGA connector 700, cable 230 would be equivalent to cable 702, cable 228 would be equivalent to cable 704.

RBG signal 708 and power supply 710 are transmitted from a video source to a video input device via cable 704 and VGA connector 700. RGB signal 708 and power supply 710 are additionally transmitted from VGA connector 700 to a local display device via cable 702. Within connector 700, a conditional terminator comprising 75-Ohm resistor 714 and transistor 716 connects RGB signal 708 to ground. The transistor 716 is activated by the connection of the power supply 710 to the transistor through parallel resistor 720 and resistor 718. Cable 702 includes ground signal 712 from a local display device when the display device is connected to the cable. A dedicated ground pin in the connector attached to cable 702 is electrically connected to transistor 716. When a display device is connected to cable 702, a ground signal from the dedicated ground pin interrupts the power supply to the transistor to deactivate it. Once deactivated, the RGB signal is no longer terminated.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A system for splitting and conditionally selectively terminating an analog video signal, comprising:
   an add-in card including
   a single video input connector that is configured to receive the analog video signal and to transmit the analog video signal to a first terminating device as well as that is configured to receive a ground signal from a second terminating device; and
   a conditional terminator operative to terminate the analog video signal in the absence of receiving the ground signal from the second terminating device through the video input connector and to not terminate the analog video signal in the presence of receiving the ground signal from the second terminating device through the video input connector.

2. The system of claim 1, wherein the conditional terminator comprises a first resistor and a switch connecting the analog video signal to ground such that the first resistor is in parallel with and having an equivalent resistance as a second resistor having resistance equal to an impedance of a video cable that provides the analog video signal from a video source to the video input connector.

3. The system of claim 2, wherein the add-in card is a low profile card such that the card has a maximum height of 2.536 inches.

4. The system of claim 3, wherein the video input connector on the add-in card is a VGA connector, the VGA connector being the only external VGA connector on the add-in card.

5. A cable apparatus for splitting and conditionally terminating an analog video signal, comprising:
   a first connector operative to receive the analog video signal from a video source;
   a second connector operative to provide the analog video signal to a terminating device;
   a third connector operative to provide the video signal to a local video input device, wherein the second connector is electrically connected to each of the first connector and the third connector through a respective cable, wherein the third connector is configured to receive a ground signal from the local video input device and to transmit the ground signal to the second connector; and
   a conditional terminator operative to terminate the analog video signal in the absence of the ground signal at the second connector and to not terminate the analog video signal in the presence of the ground signal at the second connector.

6. A video capture device that selectively terminates an analog video signal, comprising:
   a single VGA connector, the single VGA connector operative to receive an analog video signal from a video source and a ground signal from a terminating device;
   a conditional terminator electrically connected to the VGA connector operative to terminate the analog video signal in the absence of receiving the ground signal from the terminating device through the single VGA connector and to not terminate the analog video signal in the presence of receiving the ground signal from the terminating device through the single VGA connector; and
   video capture circuitry electrically connected to the conditional terminator.

* * * * *